D. P. CERA.
GRATER.
APPLICATION FILED JAN. 10, 1920.
1,335,481.
Patented Mar. 30, 1920.
2 SHEETS—SHEET 2.
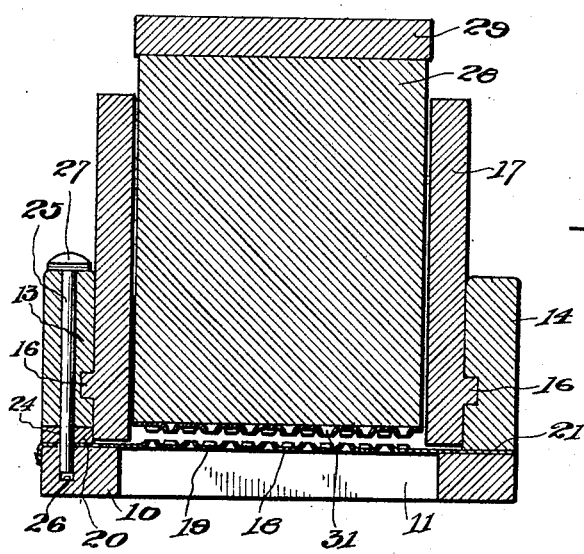
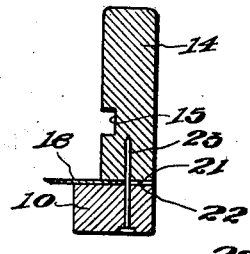
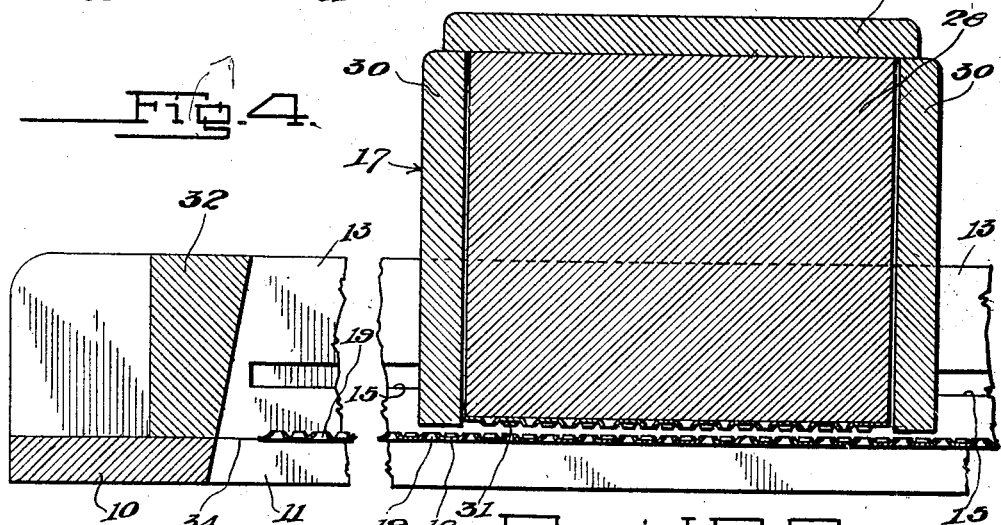
David P. Cera.
Inventor
By Lancaster and Allwine
his
Attorneys

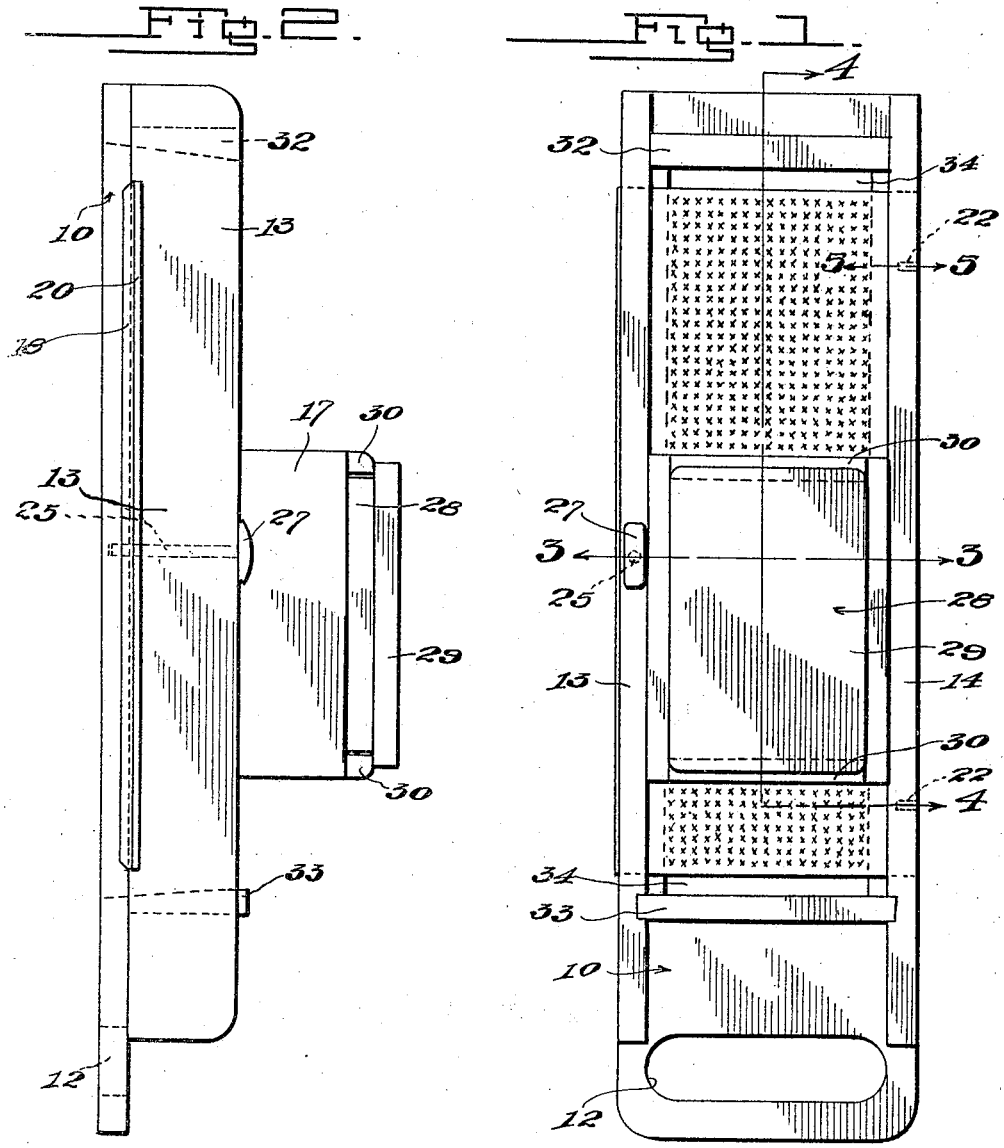

UNITED STATES PATENT OFFICE.

DAVID P. CERA, OF JUNCTION, WISCONSIN.

GRATER.

1,335,481.  Specification of Letters Patent.  Patented Mar. 30, 1920.

Application filed January 10, 1920. Serial No. 350,493.

*To all whom it may concern:*

Be it known that I, DAVID P. CERA, a citizen of the United States, residing at Junction city, in the county of Portage and State of Wisconsin, have invented certain new and useful Improvements in Graters, of which the following is a specification.

This invention relates to graters such as are employed for grating potatoes, horseradish or analogous edibles, and an object of the invention is to provide a grater which will eliminate liability of injury to the hand of the user, comprising a box like follower which receives the vegetables or other edibles to be grated and against the uppermost of which vegetables a pressure block engages, the said block and follower serving as a hand grip, when reciprocating them over the grated surface, thereby eliminating liability of contact of the hand of the user with the grating and cutting surface.

Another object of the invention is to provide a grater, as specified, which may be thoroughly and easily cleaned, to render it sanitary, the said grater comprising side members between which the vegetables carrying box reciprocates and to which it is slidably mounted and to provide a removable stop for limiting movement of the slidable box in one direction, which stop may be removed to permit the removal of the box from between its guides for cleaning, and also to removably mount the cutting or grating plate in the supporting structure or body of the grater so that it may be easily removed for cleaning or for changing to permit it to be interchanged with plates carrying different sized cutting members.

A further object of the invention is to place the stop which limits the slidable movement of the vegetable carrying box short distances beyond the ends of the cutting or grating plates, leaving openings at the end of this plate through which any grater or cut portion of the vegetables or other edibles may be forced, during the reciprocatory movement of the slidable box, and also to bevel or incline the surface of the removable stop which faces the box so as to prevent surface contact between the end of the box and this stop and consequently prevent the packing of grated edibles thereagainst.

Other objects of the invention will appear in the following detailed description taken in connection with the accompanying drawings, forming a part of this specification and in which drawings:

Figure 1 is a top plan of the improved grater.

Fig. 2 is a side elevation of the improved grater.

Fig. 3 is a cross section through the grater taken on the line 3—3 of Fig. 1.

Fig. 4 is a fragmentary longitudinal section taken on the line 4—4 of Fig. 1, and Fig. 5 is a fragmentary cross section taken on the line 5—5 of Fig. 1.

Referring more particularly to the drawings, wherein like characters indicate like and corresponding parts throughout the several views, 10 indicates the main supporting body or bore of the grater which is provided with a longitudinally extending central opening 11. The bore 10, near one end thereof is provided with a relatively small transversely extending opening 12, adapted to receive the fingers of the user therethrough, when carrying the grater or for suspending the grater from any suitable support.

A pair of upstanding sides or guides 13 and 14 are attached to the supporting board 10 one at each side edge thereof and these side boards are provided with longitudinally extending grooves 15 formed in their inner sides which receive therein tongues 16 formed upon the sides of the vegetable carrying box or follower 17. The tongues 16 slidably engage in the grooves 15 to permit longitudinal movement of the box 17 over the grating or cutting plate 18. This grating or cutting plate 18 is provided with a grating or cutting surface as shown at 19 and it has a reinforcing strip 20 attached along one edge thereof. This strip 20 engages in a slot formed in the side 13, while the edge of the plate 18 remote from the edge to which the strip 20 is attached engages in a relatively narrow space or slot 21 formed between the facing edges of the side 14 and the supporting board or bottom 10 as clearly shown in Fig. 3 of the drawings. The plate 18 is provided with slots 22 in its edge remote from the edge to which the strip 20 is attached and these slots are adapted to engage about pins 23 extending upwardly through the board 10 and into the side 14 for properly positioning the plate 18 so that the opening in the side to which the strip 20 is attached and the alining opening 24 formed in the strip 20 will register with the pin 25 which is slidably carried by the side 13 and is adapted to extend through the openings in the strip 20 and plate 18 and into the recess 26 formed in the board 10 for attaching the grating or cutting plate 18 to the body of the grater. A head 27 is formed upon the upper end of the pin 25 to facilitate its removal out of openings 24 and the opening in the plate 18 to permit the removal of this plate for cleaning or for substituting a plate having different sized cutting or grating members 19 thereon. A follower or pressure block 28 is mounted in the carrier or box 17 and it has a plate 29 mounted upon its upper surface, the ends of which project beyond the ends of the follower or pressure block 28 and engage against the upper edges of the ends 30 of the carrier 17 for limiting the insertion of the follower 28 into the carrier or box 17. By reference to Fig. 2 of the drawings it will be noted that the ends 30 of the carrier project above the upper edges of the sides thereof. The follower 28 preferably has a grating plate 31 attached to its under surface which engages the edibles or vegetables placed in the box 17.

The longitudinal movement of the carriers 17 and follower 28 between the sides 13 and 14 is limited by stop blocks 32 and 33, positioned adjacent the opposite ends of the side guides. These stop blocks have their surfaces which face the carrier 17 inclined inwardly as they extend downwardly as clearly shown in Fig. 4 of the drawings, causing their upper edges to be nearer the ends of the carrier than their lower edges, thereby preventing abutting engagement between the ends of the carrier with the facing sides of the stop block and preventing the packing of cut or grated edibles against the surfaces of these stop blocks. The grating or cutting plate 18 terminates short of the stop blocks 32 and 33, leaving openings 34 at each end of the grating or cutting plate through which openings any of the grated or cut edibles which may be moved over the upper surface of the grating or cutting plates by the carrier during its reciprocatory movement may be forced or passed through the receptacle upon which the grater rests during use.

The ends of the stop block 33 engage in vertical recesses in the side guides 13 and 14 so that it may be moved vertically for disconnecting it from the guides of the grater to permit the carrier 17 to be moved longitudinally beyond the ends of the guides 13 and 14 to permit its disconnection with the main body of the grater, when it is desired to clean the grater after use.

Changes in details may be made without departing from the spirit of this invention, but;

I claim:

1. In a grater, the combination of a supporting body board, upstanding guides carried thereby, a carrier box slidably supported by said guides, a cutting or grating plate removably carried by said body board and guide, and stops carried by said guides for limiting the movement of said carrier box, said stops having their surfaces facing the carrier box inclined to prevent surface contact of the ends of the box with said stop.

2. In a grater, the combination of a supporting body board, upstanding guides carried thereby, a carrier box slidably supported by said guides, a cutting or grating plate removably carried by said body board and guide, stops carried by said guides for limiting the movement of said carrier box, said stops having their surfaces facing the carrier box inclined to prevent surface contact of the ends of the box with said stop, said cutting or grating plate terminating short of said stop to provide an opening at each end of the plate.

3. In a grater, the combination, of a supporting body board, upstanding guides carried thereby, a carrier box slidably supported by said guide, a cutting or grating plate removably carried by said body board and guides, said plates provided with cut out portions in one edge, and pins carried by said body boards at one side for engagement in said cut out portions to properly position said plate.

4. In a grater, the combination, of a supporting body board, upstanding guides carried thereby, a carrier box slidably supported by said guides, a cutting or grating plate removably carried by said body board and guides, said plates provided with cut-out portions in one edge, pins carried by said body board at one side for engagement in said cut-out portions to properly position said plate, a reinforcing strip attached to the upper surface of said plate at the edge opposite the edge provided with said cut out portions, said supporting strip and plate provided with alining openings, and a pin carried by one of said guides for insertion through said openings.

5. In a grater, the combination of a supporting body board, upstanding guides carried by said body board and provided with longitudinally extending grooves in their inner surfaces, a carrier box, tongues formed along the sides of said carrier box and engaging in said groove, a cutting or grating plate removably carried by said body board and guides beneath said carrier box, stops for limiting the movement of said box between said guides, one of said stops being slidably associated with the guides to permit the removal thereof so as to permit the disconnection of said carrier box and guides.

6. In a grater, the combination of a supporting body board, upstanding guides carried by said body board and provided with longitudinally extending grooves in their inner surfaces, a carrier box, tongues formed along the sides of said carrier box and engaging in said groove, a cutting or grating plate removably carried by said body board and guides beneath said carrier box, stops for limiting the movement of said box between said guides, one of said stops being removable to permit the disconnection of said carrier box and guides, said stops having their surfaces facing the ends of said carrier box inclining away from the carrier box from their upper edges to their lower edges to prevent surface contact of the carrier box with the stops.

7. In a grater, the combination of a supporting body board, upstanding guides carried by said body board and provided with longitudinally extending grooves in their inner surfaces, a carrier box, tongues formed along the sides of said carrier box and engaging in said groove, a cutting or grating plate removably carried by said body board and guides beneath said carrier box, stops for limiting the movement of said box between said guides, one of said stops being removable to permit the disconnection of said carrier box and guides, said stops having their surfaces facing the ends of said carrier box inclining away from the carrier box from their upper edges to their lower edges to prevent surface contact of the carrier box with the stops, said cutting or grating plates terminating short of said stops and providing openings at each end thereof.

DAVID P. CERA.